United States Patent Office 3,355,521
Patented Nov. 28, 1967

3,355,521
HYDRAZINE DERIVATIVES OF PENTAE-
RYTHRITOL PHOSPHATES
Arthur D. Bliss, Guilford, Miriam J. Gruber, New Haven,
and Rudi F. W. Rätz, Hamden, Conn., assignors to Olin
Mathieson Chemical Corporation, New Haven, Conn., a
corporation of Virginia
No Drawing. Filed Aug. 17, 1965, Ser. No. 480,486
10 Claims. (Cl. 260—923)

This invention relates to hydrazine derivatives of pentaerythritol phosphates. More particularly it relates to organophosphorous compounds having the following general formula:

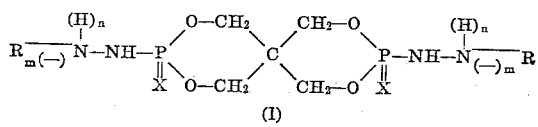

(I)

where X is oxygen or sulfur, R is hydrogen, alkylidene, haloalkylidene, benzylidene and substituted benzylidene, $m$ and $n$ are integers from 0–1 and the sum of $m$ and $n$ is always 1, R represents hydrogen only when $n$ is 1, and R represents the above-mentioned divalent radicals only when $m$ is 1.

Necessary intermediates for the preparations described herein are 3,9-dichloro-2,4,8,10-tetraoxa-3,9-diphosphaspiro[5.5]undecane-3,9-dioxide and the corresponding -3,-9-disulfide. Preparation of the former compound has been disclosed, for example, by Charonnat et al. in Ann. pharm. franc., vol 10, 666–9 (1952). The latter compound is conveniently provided by the reaction of 3,9-dichloro-2,4,8,10-tetraoxa-3,9-diphosphaspiro [5.5] undecane with hydrogen sulfide in dimethylacetamide to provide pentaerythritol bis-hydrogen thiophosphite which can then be reacted with carbon tetrachloride in the same solvent in the presence of a tertiary amine to provide the desired disulfide. Reaction of these intermediates with hydrazine then proceeds in accordance with the following equation to provide the simplest derivatives II included in the general formula I wherein X is as previously represented.

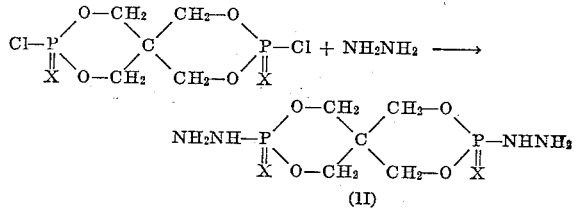

(II)

The preparation of the hydrazides II is accomplished by reacting hydrazine with the aforementioned -3,9-dioxide and -3,9-disulfide at a temperature range of about 0°–50° C. The reaction is preferably performed in a solvent, and best results are obtained when a temperature of 30° C. or less is utilized. Among the suitable solvents are dimethylacetamide, chloroform and dioxane. An excess of hydrazine may be employed in order to remove evolved chloride as the hydrochloride which can be removed by filtration from the reaction mixture. The hydrazides II are then conveniently isolated by adding the filtrate to water or alcohol. The insoluble hydrazides are easily isolated by conventional separation procedures including filtration, centrifugation and the like.

It has been found that the hydrazides II react with a wide variety of aldehydes and ketones to provide additional compounds included in the general Formula I. For instance, reactions of this nature are illustrated in the following equations wherein acetaldehyde and acetone respectively are reacted with the hydrazides II.

II + $CH_3CHO$ ⟶

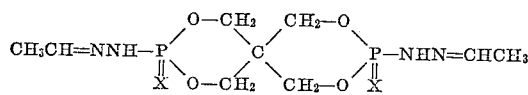

II + $(CH_3)_2C=O$ ⟶

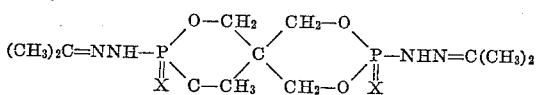

However, preferred embodiments of this invention include those compounds of the general formula I wherein R is alkylidene having 1–9 carbon atoms, chloroalkylidene having 2–5 carbon atoms, benzylidene, halogenated benzylidene and nitrated benzylidene. Thus among the preferred aldehyde and ketone reactants which can be reacted with the hydrazides II are formaldehyde, acetaldehyde, propionaldehyde, butyraldehyde, isobutyraldehyde, acetone, methyl ethyl ketone, diethyl ketone, dipropyl ketone, dibutyl ketone, cyclohexanone, chloroacetaldehyde, 1,3-dichloropropanone-2, chloral and dichloroacetaldehyde. Similarly, benzaldehyde, 2-chlorobenzaldehyde, 3-chlorobenzaldehyde, 4-chlorobenzaldehyde, 2-bromobenzaldehyde, 3-bromobenzaldehyde, 4-bromobenzaldehyde, 2-fluorobenzaldehyde, 3-fluorobenzaldehyde, 4-fluorobenzaldehyde, 2,4-dichlorobenzaldehyde, 2,5-dichlorobenzaldehyde, 3,5-dichlorobenzaldehyde, 2-nitrobenzaldehyde, 3-nitrobenzaldehyde, 4-nitrobenzaldehyde, 2,4-dinitrobenzaldehyde and 3,5-dintrobenzaldehyde are included among the preferred reactants which may be employed in the preparation of compounds included in the general formula I. Acetophenone and benzophenone may also be employed in the reaction with the hydrazides II in accordance with the process described herein.

The reaction of the hydrazines II with the aldehydes and ketones is accomplished at about 0° C. to about 125° C. in the presence of various inert diluents. Illustrative of the diluents which have been employed in this process are aromatic hydrocarbons such as toluene, benzene and the like, dimethylacetamide, water, and the lower alkanols. Alternatively, an excess of the aldehyde or ketone reactant may be employed as diluent. At the completion of the reaction, the products are isolated by diluent removal followed by recrystallization procedures if desired.

It has been found that the hydrazine derivatives of pentaerythritol phosphates disclosed herein are useful agricultural chemicals. Specifically, they have demonstrated utility as post-emergence herbicides against a variety of weed species including pigweed and crabgrass. The compounds I are also useful as foliar fungicides and as soil fungicides.

The hydrazides II, which are included in the general formula I, are useful organic intermediates. For instance, they react with cyclic oxides such as ethylene and propylene oxides to provide phosphorus-containing polyols having special utility in the preparation of urethane polymers having enhanced resistance to deterioration by flame.

The following examples are illustrative of the preparation of the derivatives I.

Example 1

To a stirred, ice-cooled solution of 29.7 g. (0.1 mole) of 3,9-dichloro-2,4,8,10-tetraoxa-3,9-diphosphaspiro[5.5]- undecane-3,9 dioxide in 370 ml. of freshly distilled N,N-dimethylacetamide was added 13.4 g. (0.42 mole) of anhydrous hydrazine at such a rate that the temperature of the solution remained below 20° C. After completion of the addition, the mixture was warmed to room temperature and stirred for 20 minutes. Hydrazine hydrochloride was removed by filtration, washed with ether and dried in vacuo. There was obtained 13.8 g. of this material (calcd.: 13.7 g.). The filtrate (450 ml.) was divided into two equal portions and each was added to 1000 ml. of ethanol. Solid separated slowly from the mixtures. After one hour, the two portions of product were filtered, mixed and dried in vacuo to give 24.3 g. of white powder. A 16.2 g. portion of this material was washed with water and ethanol to provide 12.9 g. of chlorine-free white crystals, M.P. 217°–221° C. (dec.). The following analytical data revealed that 3,9 - bis(hydrazino)2,4,8,10-tetraoxa-3,9-diphosphaspiro[5.5]undecane-3,9-dioxide had been obtained. Yield: 84.%.

*Analysis.*—Calcd. for $C_5H_{14}H_4O_6P_2$: C, 20.84; H, 4.90; N, 19.45; P, 21.50. Found: C, 21.38; H, 5.01; N, 19.43; P, 21.17.

*Example 2*

A stirred solution of 16.5 g. (0.05 mole) of 3,9-dichloro - 2,4,8,10 - tetraoxa - 3,9 - diphosphaspiro[5.5]undecane-3,9-disulfide in 100 ml. of anhydrous N,N-dimethylacetamide was cooled in an ice bath and treated dropwise over a period of 40 minutes with a solution of 6.4 g. (0.2 mole) of anhydrous hydrazine in 25 ml. of dimethylacetamide. Upon completion of the addition, the mixture was allowed to warm to room temperature and was stirred for 30 minutes. Filtration and drying gave 6.5 g. (96%) of hydrazine hydrochloride. The filtrate was poured into 800 ml. of cold water, yielding a white solid which was filtered, washed with water and dried overnight in vacuo over phosphorus pentoxide. The solid, 14.9 g., (93%) melted at 198°–199° C. Recrystallization from dioxane gave 11.6 g. melting at 199°–200° C. after previous sintering at 160° C. The following analytical data revealed that 3,9-bis(hydrazino)2,4,8,10 - tetraoxa-3,9-diphosphaspiro[5.5]undecane-3,9-disulfide had been obtained in the form of a complex with one mole of dioxane.

*Analysis.*—Calcd. for $C_5H_{14}N_4O_4P_2S_2 \cdot C_4H_8O_2$: N, 13.71; P, 15.18. Found: N, 13.78; P, 15.12.

Drying overnight in vacuo over phosphorus pentoxide at a temperature of 110° C. removed most of the dioxane, although both infrared and elemental analysis revealed that traces of solvent were still present.

*Analysis.*—Calcd. for $C_5H_{14}N_4O_4P_2S_2$: C, 18.75; H, 4.40; N, 17.49; P, 19.34. Found: C, 19.28; H, 4.55; N, 17.52; P, 18.90.

*Example 3*

A 300 ml. flask was charged with 5.0 g. of 3,9-bis(hydrazino)2,4,8,10-tetraoxa - 3,9 - diphosphaspiro[5.5]undecane-3,9-disulfide, 50 ml. of acetone and 125 ml. of toluene. The excess acetone was removed by distillation, the flask fitted with a Dean-Stark trap and the mixture was refluxed for 3 hours. No water separation could be observed in the Dean-Stark trap. Upon cooling the toluene solution, colorless crystals were obtained. Filtration and drying gave 5.6 g. (90%) of product melting at 221°–222° C. Evaporation of the toluene filtrate gave 0.6 g. of yellow solid. Recrystallization of this from ethanol produced 0.4 g. of colorless material which melted at 221°–222° C. The following analytical data revealed that 3,9-bis(isoproplidenehydrazino)2,4,8,10-tetraoxa-3,9-diphosphaspiro[5.5]undecane - 3,9-disulfide had been prepared. Yield: 95.5%.

*Analysis.*—Calcd for $C_{11}H_{22}N_4O_4P_2S_2$: C, 32.99; H, 5.54; N, 14.00; P, 15.47. Found: C, 32.98; H, 5.64; N, 14.54; P, 15.48.

*Example 4*

To a stirred solution of 3.2 g. of 3,9-bis(hydrazino)2,4,8,10-tetraoxa-3,9-diphosphaspiro[5.5]undecane - 3,9-disulfide in 20 ml. of N,N-dimethylacetamide was added a solution of 2.5 g. of 1,3-dichloropropanone-2 in 15 ml. of the same solvent. The solution was allowed to stand for 3 hours at room temperature and was then poured into 300 ml. of ice-water. A slightly yellow solid was filtered, washed with water and dried in vacuo, giving 5.1 g. (94.5%) of product which melted at 160° C. with decomposition. Recrystallization from ethanol gave 3.2 g. melting at 167° C. (dec.). The following analytical data revealed that 3,9-bis(1',3'-dichloroisopropylidenehydrazino)2,4,8,10-tetraoxa-3,9 - diphosphaspiro[5.5]undecane-3,9-disulfide had been obtained.

*Analysis.*—Calcd. for $C_{11}H_{18}Cl_4N_4O_4P_2S_2$: C, 24.54; H, 3.37; Cl, 26.4; P, 11.51. Found: C, 25.29; H, 3.61; Cl, 25.1; P, 11.74.

*Example 5*

To a solution of 7.2 g. (0.025 mole) of 3,9-bis(hydrazino)2,4,8,10 - tetraoxa-3,9 - diphosphaspiro[5.5]undecane-3,9-dioxide in 50 ml. of water was added 5.9 g. (0.05 mole) of benzaldehyde. A yellow solid separated rapidly and was filtered, dried, extracted four times with warm benzene and dried again to give 4.0 g. of white powder which melted at 241°–245° C. with decomposition after softening at 145° C. followed by resolidification at 160° C. The yellow solid removed by the benzene extraction was identified as dibenzalazine, M.P. 95.5 C. The following analytical data revealed that 3,9-bis(benzylidenehydrazino)2,4,8,10 - tetraoxa-3,9 - diphosphaspiro[5.5]undecane-3,9-dioxide had been prepared.

*Analysis.*—Calcd. for $C_{19}H_{22}N_4O_6P_2$: N, 12.07; P, 13.34. Found, N, 12.04; P, 13.43.

*Example 6*

A mixture of 3.2 g. of 3,9-bis(hydrazino)2,4,8,10-tetraoxa - 3,9-diphosphaspiro[5.5]undecane - 3,9-disulfide and 3.8 g. of 2,4-dichlorobenzaldehyde in 65 ml. of ethanol was heated to 45°–50° C. with vigorous stirring for a period of 3 hours. Filtration and drying gave 5.6 g. (89%) of white crystalline solid which melted at 245°–247° C. Recrystallization from ethanol yielded 4.1 g. melting at 246°–247° C. The following analytical data revealed that 3,9(bis-2',4'-dichlorobenzylidenehydrazino)2,4,8,10-tetraoxa-3,9 - diphosphaspiro[5.5]undecane-3,9-disulfide had been obtained.

*Analysis.*—Calcd. for $C_{19}H_{18}Cl_4N_4O_4P_2S_2$: C, 35.96; H, 2.81; Cl, 21.9; P, 9.71. Found: C, 36.35; H, 2.96; Cl, 22.5; P, 9.62.

*Example 7*

To 4.3 g. (0.015 mole) of 3,9-bis(hydrazino)2,4,8,10-tetraoxa-3,9 -diphosphaspiro[5.5]undecane - 3,9-dioxide partially dissolved in 80 ml. of N,N-dimethylacetamide was added 4.7 g. (0.031 mole) of p-nitrobenzaldehyde in 30 ml. of the same solvent. The mixture was heated gently until all but a trace of solid remained undissolved, filtered, cooled and poured into 150 ml. of water. Filtration and drying gave a yellow solid which was purified by dissolution in dimethylacetamide and precipitation with ethanol. The product decomposed at 297°–303° C. The following analytical data revealed that 3,9-bis(p-nitrobenzylidenehydrazino)2,4,8,10 - tetraoxa - 3,9 - diphosphospiro[5.5]undecane - 3,9 - dioxide has been obtained. Yield: 70.3%.

*Analysis.*—Calcd. for $C_{19}H_{20}N_6O_{10}P_2$: C, 41.17; H, 3.64; N, 15.16; P, 11.17. Found: C, 41.43; H, 4.00; N, 15.29; P, 10.75.

*Examples 8–15*

Using the procedures in the foregoing examples, a number of other hydrazine derivatives of pentaerythritol phosphates have been prepared. Included among the additional compounds I are the compounds listed in the following table.

TABLE I

| Name | Properties |
|---|---|
| 3,9-bis(isopropylidenehydrazino)2,4,8,10-tetraoxa-3,9-diphosphaspiro[5.5]undecane-3,9-dioxide. | White crystals, M.P. 130-35° C. (dec.). |
| 3,9-bis(1',3'-dichloroisopropylidenehydrazino)2,4,8,10-tetraoxa-3,9-diphosphaspiro[5.5]undercane-3,9-dioxide. | Light yellow crystals, M.P. 192-98° C. (dec.). |
| 3,9-bis(benzylidenehydrazino)2,4,8,10-tetraoxa-3,9-diphosphaspiro[5.5]undecane-3,9-disulfide. | White crystals, M.P. 137-39° C. (dec.). |
| 3,9-bis(2',4'-dichlorobenzylidenehydrazino)2,4,8,10-tetraoxa-3,9-diphosphaspiro[5.5]undecane-3,9-dioxide. | White crystals, M.P. 258-61° C. (dec.). |
| 3,9-bis(p-nitrobenzylidenehydrazino)2,4,8,10-tetraoxa-3,9-diphosphaspiro[5.5]undecane-3,9-disulfide. | Yellow crystals, M.P. 265-66° C. (dec.). |
| 3,9-bis(2',2',2'-trichloroethylidenehydrazino)2,4,8,10-tetraoxa-3,9-diphosphaspiro[5.5]undecane-3,9-dioxide. | White crystals, M.P. 79-82° C. |
| 3,9-bis(2',2',2'-trichloroethylidinehydrazino)2,4,8,10-tetraoxa-3,9-diphosphaspiro[5.5]undecane-3,9-disulfide. | Pale yellow crystals, M.P. 85° C. (dec.). |
| 3,9-bis(2',2'-dichloroethylidenehydrazino)2,4,8,10-tetraoxa-3,9-diphosphaspiro[5.5]undecane-3,9-dioxide. | White Crystals, M.P. 176-78° C. (dec.). |

What is claimed is:

1. Hydrazine derivatives of pentaerythritol phosphates having the formula

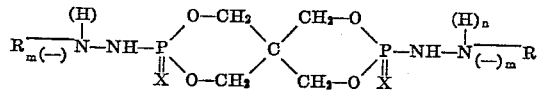

wherein X is oxygen or sulfur; R is hydrogen, alkylidene having 1-9 carbon atoms, chloroalkylidene having 2-5 carbon atoms, benzylidene, halogenated benzylidene and nitrated benzylidene; $m$ and $n$ are integers from 0-1 and the sum of $m$ and $n$ is always 1, R represents hydrogen only when $n$ is 1, and R represents said divalent radicals only when $m$ is 1.

2. The compounds of claim 1 wherein R is benzylidene and $m$ is 1.

3. The compounds of claim 1 wherein R is alkylidene having 1-9 carbon atoms, and $m$ is 1.

4. 3,9-bis(isopropylidenehydrazino)2,4,8,10 - tetraoxa-3,9-diphosphaspiro[5.5]undecane-3,9-disulfide.

5. 3,9-bis(isopropylidenehydrazino)2,4,8,10 - tetraoxa-3,9-diphosphaspiro[5.5]undecane-3,9-dioxide.

6. The compounds of claim 1 wherein R is chloroalkylidene having 2-5 carbon atoms and $m$ is 1.

7. The compounds of claim 1 wherein R is halogenated benzylidene and $m$ is 1.

8. The compounds of claim 1 wherein R is nitrated benzylidene and $m$ is 1.

9. 3,9 - bis(hydrazino)2,4,8,10 - tetraoxa - 3,9-diphosphaspiro[5.5]undecane-3,9-dioxide.

10. 3,9-bis(hydrazino)2,4,8,10 - tetraoxa - 3,9-diphosphaspiro[5.5]undecane-3,9-disulfide.

No references cited

CHARLES B. PARKER, *Primary Examiner.*

A. H. SUTTO, *Assistant Examiner.*